March 10, 1959   V. A. TAUSCHER   2,876,655

STEPPER MOTOR

Filed Dec. 27, 1954

INVENTOR:
Vernon A. Tauscher
By Hubert E. Metcalf
His Patent Attorney

United States Patent Office 2,876,655
Patented Mar. 10, 1959

2,876,655
STEPPER MOTOR

Vernon Arthur Tauscher, Los Angeles, Calif., assignor to Northrop Aircraft, Inc., Hawthorne, Calif., a corporation of California Application December 27, 1954, Serial No. 477,656

9 Claims. (Cl. 74—565)

This invention has to do with electrically energized instruments and more particularly with incremental or stepper motors.

Stepper motors are used to control accurately functioning mechanisms such as computing devices, servo systems, and electrical relay systems that may be found in communication equipment and similar applicable structure.

Devices of the kind to which this invention relates should operate on the electrical power provided, be so constructed that they may be readily incorporated in place of other previously used devices in a wide variety of equipment and should be readily adapted to the special needs of whatever type of equipment the device is to be used.

Therefore, the principal object of this invention is to provide an electrical pulse actuated stepper motor that will operate very accurately, on the power provided, in the environment and for the purpose selected, and for an extended period of time without missing pulses.

Another object of this invention is to provide an electrical pulse actuated stepper motor capable of use in a variety of equipment, that may be readily actuated in one or the other direction or alternately in one direction and then the other or in any combination thereof.

Figure 3:
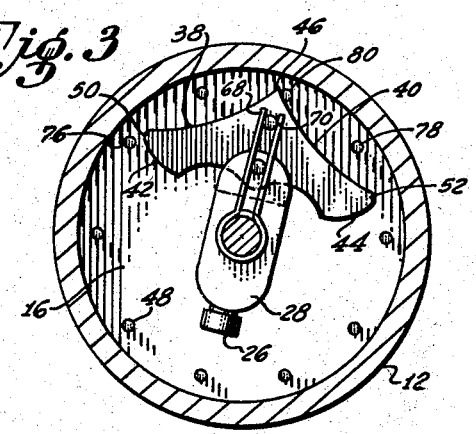
Figure 4:
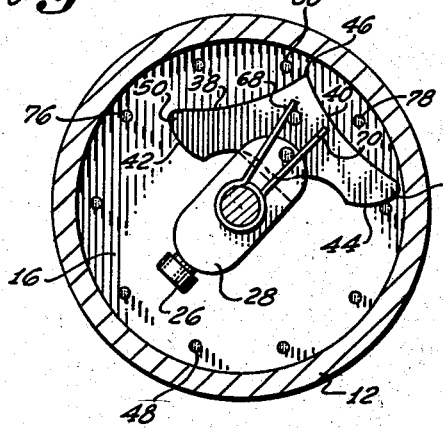
Figure 5:
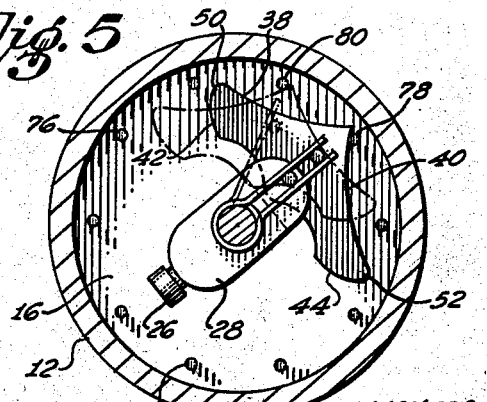

Figures 3 and 5 inclusive are schematic views illustrating in sequence the operative steps of the driver, and escapement pawl.

Referring to the drawings, 10 designates a stepper motor having enclosed within a cylindrical housing 12 a conventional torque motor energized by electrical pulses transmitted thereto through electrical leads 14.

The housing 12 provides a circular partition 16 that separates a compartment 18 from the torque motor located in the former. Compartment 18 is enclosed by a cap 20 secured to housing 12 in a conventional manner.

Extending outwardly of housing 12, through partition 16 and cap 20 and supported therein by a bearing 22, only one of which is shown, and into compartment 18 is an elongated driving shaft 24 that is rotatably actuated by the torque motor.

Figure 1:
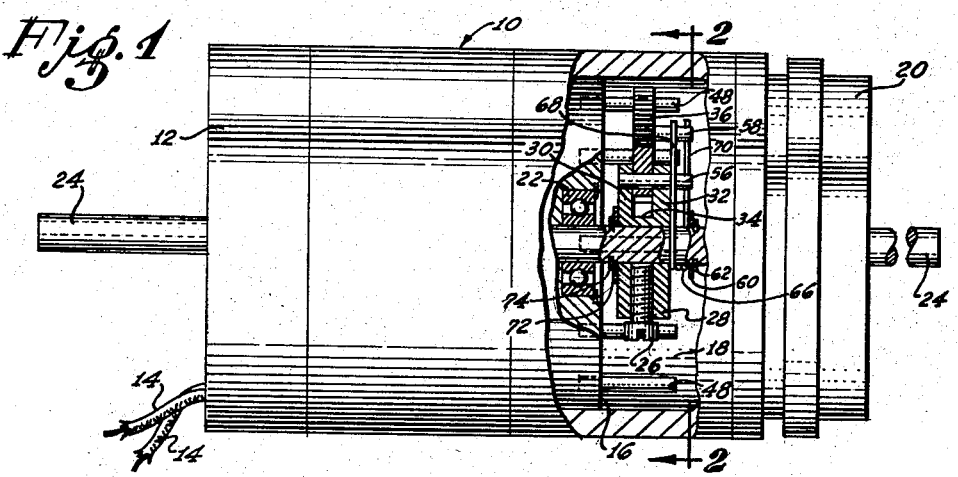
Figure 1 is a fragmentary cross-sectional view of a stepper motor having embodied therein the present invention.

Secured to shaft 24, by a set screw 26 or other equally applicable structure, intermediate its ends and located in compartment 18 is a U-shaped driver 28. Disposed between the legs 30 and 32 and spaced from the bight 34 of driver 28 is an irregular shaped pawl 36. The peripheral edges of the pawl 36 comprise a plurality of arcuate and merging cam surfaces 38, 40, 42 and 44. Cam surfaces 38 and 40 merge resulting in an apex 46 that contacts the deflecting and stop pins 48 to deflect the pawl 36 as it rotates through its path of travel. Cam surface 38 merges with cam surface 42 resulting in another apex 50 that also contacts pins 48. Cam surface 40 merges with cam surface 44 to form another apex 52 that performs in the identical manner as apex 50. Spaced midway between apexes 50 and 52, in opposed relationship to apex 46 and integral with pawl 36 is an arcuate projection 54 that has an opening therethrough that registers with similar openings in legs 30 and 32. A pin 56 is positioned in said openings, extends from leg 32 toward the cap 20 in the manner illustrated in Figure 1 of the drawings, and the pawl 36 pivots thereabout.

It is to be noted that there are a plurality of stop and deflecting pins 48 secured in circular partition 16, equally spaced thereabout, and from but adjacent to the peripheral edge thereof.

Pressed into an opening in the pawl 36, spaced from but adjacent apex 46 and in alignment with pin 56 is another pin 58 that also extends outwardly from the pawl 36 in the same manner as pin 56.

Coiled about the shaft 24, and held in a biased position against driver 28 by a thrust washer 60 and snap ring 62, is a spring 66 that has integral therewith a pair of arms 68 and 70. Arm 68 is disposed on one side of pins 56 and 58 and arm 70 is disposed on the opposed side. Opposed to the thrust washer 60 and snap ring 62 and bearing against the driver 28 is another thrust washer 72 and snap ring 74.

The operation of the stepper motor is as follows and attention is directed to Figures 2 to 5 inclusive.

Figure 2:
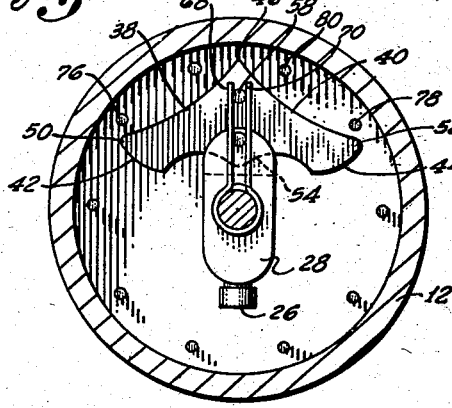
Figure 2 is a transverse, cross-sectional view taken on lines 2—2 in Figure 1 looking in the direction indicated and illustrating the driver, escapement pawl and stop and deflecting pins.

Figure 2 illustrates the driver 28 and pawl 36 in the normal position between a pair of deflecting and stop pins 48 before the torque motor is energized. For purposes of reference three of the pins 48 will be given an additional indicia in order that the pawl 36 and driver 28 may be oriented relative thereto. It is to be noted that the apexes 50 and 52 are spaced below pins 76 and 78. When the torque motor is energized to rotate the shaft 24, driver 28, and pawl 36, the apex 46 strikes deflecting pin 80 in the manner illustrated in Figure 3 of the drawings. The apex 50 is above the longitudinal axes of pin 76 and apex 52 is below the longitudinal axis of pin 78. Continued rotation of the motor causes the pawl 36 to deflect from pin 80, in opposition to the urging of one arm 68 on spring 66 in the manner illustrated in Figure 4 of the drawings. This deflection results in pawl 36 assuming the position illustrated in Figure 4 with cam surface 44 resting on pins 78. With this condition prevailing, continued torque applied by the torque motor will result in locking the shaft against further rotation due to the fact that the pawl 36 strikes the bight 34 of driver 28. Therefore in order that a rotative step may subsequently be made in either a clockwise or counterclockwise direction, the torque motor must be de-energized. This will result in the spring 66 pulling the pawl 36 back toward the radially extended position illustrated in Figure 2. However the return pull will result in the pawl 36 assuming the dotted line position illustrated in Figure 5 of the drawings. There will be a limited amount of vibration until the pawl 36 and driver 28 assume the position illustrated in full lines in Figure 5. A complete step of the incremental motor has been completed. However it is to be understood that the motor may be energized to cause rotation in the same or reverse direction in the manner as described.

While in order to comply with the statute, the invention has been described in language more or less specific as to structure features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An incremental motion control comprising a housing; a rotatable shaft, in said housing, having alternately torque and torque release applied thereto; a U-shaped driver on said shaft; a pawl on said driver positioned between the legs and spaced from the bight thereof; a pin extending through the legs of the driver and pawl about which the latter is free to pivot; and elements on said housing engaged by said pawl for limiting the rotation of said driver, pawl, and shaft.

2. An incremental motion control comprising a housing; a rotatable shaft, in said housing, having alternately torque and torque release applied thereto; a U-shaped driver on said shaft; a pawl on said driver positioned between the legs and spaced from the bight thereof; a pin extending through the legs of the driver and pawl about which the latter is free to pivot; and elements on said housing engaged by said pawl for limiting the rotation of said driver, pawl, and shaft; said elements being a plurality of equally spaced pins.

3. An incremental motion control comprising a housing; a rotatable shaft, in said housing, having alternately torque and torque release applied thereto; a U-shaped driver on said shaft; a pawl on said driver positioned between the legs and spaced from the bight thereof; a pin extending through the legs of the driver and pawl about which the latter is free to pivot; elements on said housing engaged by said pawl for limiting the rotation of said driver, pawl, and shaft; and resilient means on the shaft and interconnected to the driver and pawl for orienting the same relative to their normal torque release position when torque release is applied to said shaft.

4. An incremental motion control comprising a housing; a rotatable shaft, in said housing, having alternately torque and torque release applied thereto; a U-shaped driver on said shaft; a pawl on said driver positioned between the legs and spaced from the bight thereof; a pin extending through the legs of the driver and pawl about which the latter is free to pivot; elements on said housing engaged by said pawl for limiting the rotation of said driver, pawl and shaft; and resilient means on the shaft and interconnected to the driver and pawl for orienting the same relative to their normal torque release position when torque release is applied to said shaft; said means being an armed spring.

5. An incremental motion control comprising a cylindrical housing; a rotatable shaft, in said housing, having alternately torque and torque release applied thereto and being capable of bidirectional rotation, in increments only, a complete circle, and more as well as incremental parts of a circle; a driven assembly on said shaft that is rotatable therewith; elements on said housing engaged by said driven assembly for limiting the rotation of said driven assembly and shaft; and means on the shaft and interconnected to said driven assembly for orienting the latter relative to its normal torque release position when torque release is applied to said shaft.

6. An incremental motion control comprising a cylindrical housing; a rotatable shaft, in said housing, having alternately torque and torque release applied thereto and being capable of bidirectional rotation, in increments only, a complete circle and more as well as incremental parts of a circle; a driven assembly on said shaft that is rotatable therewith; elements on said housing engaged by said driven assembly for limiting the rotation of said driven assembly and shaft; and means on the shaft and interconnected to said driven assembly for orienting the latter relative to its normal torque release position when torque release is applied to said shaft; said driven assembly including a driver.

7. An incremental motion control comprising a cylindrical housing; a rotatable shaft, in said housing, having alternately torque and torque release applied thereto and being capable of rotating, in increments, a complete circle and more as well as incremental parts of a circle; a driven assembly on said shaft that is rotatable therewith; elements on said housing engaged by said driven assembly for limiting the rotation of said driven assembly and shaft; and means on the shaft and interconnected to said driven assembly for orienting the latter relative to its normal torque release position when torque release is applied to said shaft; said driven assembly including a spring loaded and pivotal escapement pawl.

8. An incremental motion control comprising a cylindrical housing; a rotatable shaft, in said housing, having alternately torque and torque release applied thereto and being capable of bidirectional rotation, in increments only, a complete circle and more as well as incremental parts of a circle; a driven assembly on said shaft that is rotatable therewith; elements on said housing engaged by said driven assembly for limiting the rotation of said driven assembly and shaft; and means on the shaft and interconnected to said driven assembly for orienting the latter relative to its normal torque release position when torque release is applied to said shaft; said elements being a plurality of equally spaced pins.

9. An incremental motion control comprising a cylindrical housing; a rotatable shaft, in said housing, having alternately torque and torque release applied thereto and being capable of rotating, in increments, a complete circle and more as well as incremental parts of a circle; a driven assembly on said shaft that is rotatable therewith; elements on said housing engaged by said driven assembly for limiting the rotation of said driven assembly and shaft; and means on the shaft and interconnected to said driven assembly for orienting the latter relative to its normal torque release position when torque release is applied to said shaft; said means being an armed spring.

References Cited in the file of this patent

UNITED STATES PATENTS

| | | |
|---|---|---|
| 1,794,234 | Le Francois | Feb. 24, 1931 |
| 2,298,621 | Holland-Letz | Oct. 13, 1942 |
| 2,369,690 | Roth | Feb. 20, 1945 |
| 2,810,302 | James et al. | Oct. 22, 1957 |